United States Patent [19]

Sakoe

[11] 4,319,221

[45] Mar. 9, 1982

[54] SIMILARITY CALCULATOR COMPRISING A BUFFER FOR A SINGLE INPUT PATTERN FEATURE VECTOR TO BE PATTERN MATCHED WITH REFERENCE PATTERNS

[75] Inventor: Hiroaki Sakoe, Tokyo, Japan

[73] Assignee: Nippon Electric Co., Ltd., Tokyo, Japan

[21] Appl. No.: 153,293

[22] Filed: May 27, 1980

[30] Foreign Application Priority Data

May 29, 1979 [JP] Japan .................................. 54-66589

[51] Int. Cl.³ .......................... G06K 9/00; G10L 1/00
[52] U.S. Cl. .......................... 340/146.3 Q; 179/1 SD; 364/513
[58] Field of Search ................ 179/1 SA, 1 SB, 1 SC, 179/1 SD; 340/146.3 Q, 146.3 AQ, 146.2; 364/513, 728

[56] References Cited

U.S. PATENT DOCUMENTS

| | | | |
|---|---|---|---|
| 2,947,971 | 8/1960 | Glauberman et al. | 340/146.3 Q |
| 3,688,267 | 8/1972 | Iijima et al. | 340/146.3 Q |
| 3,727,193 | 4/1973 | Bolie | 340/146.3 Q |
| 3,816,722 | 6/1974 | Sakoe et al. | 179/1 SD |
| 3,906,446 | 9/1975 | Iijima et al. | 340/146.3 Q |
| 4,049,913 | 9/1977 | Sakoe | 179/1 SD |
| 4,059,725 | 11/1977 | Sakoe | 179/1 SD |
| 4,119,946 | 10/1978 | Taylor | 340/146.2 |
| 4,153,897 | 5/1979 | Yasuda et al. | 340/146.3 Q |
| 4,181,821 | 1/1980 | Pirz et al. | 179/1 SD |
| 4,256,924 | 3/1981 | Sakoe | 179/1 SD |

*Primary Examiner*—Leo H. Boudreau
*Attorney, Agent, or Firm*—Sughrue, Mion, Zinn, Macpeak and Seas

[57] ABSTRACT

A similarity calculator for calculating a set of similarity measures $S(A(u, m), B^c)$'s according to the technique of dynamic programming comprises an input pattern buffer for successively producing input pattern feature vectors of an input pattern A to be pattern matched with reference patterns $B^c$, an m-th input pattern feature vector $a_m$ at a time. The similarity measure set is for a set of fragmentary patterns $A(u, m)$'s defined by a common end point m and start points u's predetermined relative to the end point m. Scalar products $(a_m \cdot b_j^n)$ are calculated between the m-th input pattern feature vector and reference pattern feature vectors $b_j^n$ of an n-th reference pattern $B^n$ and stored in a scalar product buffer. Recurrence values are calculated according to a recurrence formula for each end point m, rather than for each fragmentary pattern set, and for each reference pattern $B^n$ to provide a similarity measure subset $S(A(u, m), B^n)$'s, with a recurrence value for each reference pattern feature vector $b_v$ calculated by the use of the scalar product $(a_m \cdot b_v)$ and recurrence values calculated for a previous end point $(m-1)$ and for at least three consecutive reference pattern feature vectors preselected relative to that reference pattern feature vector $b_v$. Instead of the scalar product, it is possible to use any one of other measures representative of a similarity or a dissimilarity between an input pattern feature vector and a reference pattern feature vector.

2 Claims, 8 Drawing Figures

SIMILARITY CALCULATOR COMPRISING A BUFFER FOR A SINGLE INPUT PATTERN FEATURE VECTOR TO BE PATTERN MATCHED WITH REFERENCE PATTERNS

BACKGROUND OF THE INVENTION

This invention relates to a similarity calculator for use in a pattern recognition system in calculating a similarity measure between two or more patterns according to the technique of dynamic programming.

Among the pattern recognition systems, those capable of recognizing spoken words and called speech recognition systems are widely required as input devices as, for example, for supplying data to electronic digital computers and control data to automatic classification apparatus, and have already been developed into commercial products. The speech recognition systems are classified into two classes. Those of one class are known as continuous speech recognition systems and are capable of carrying out the recognition even when a plurality of words are continuously spoken as a word sequence. Those of the other class are capable of carrying out the recognition only when the words are spoken word by word. The continuous speech recognition systems are more excellent than the speech recognition system of the other class because of easiness of pronouncing the words and a higher speed of operation. It is, however, not readily feasible to make a speech recognition system recognize a sequence of continuously spoken words. In fact, a greater number of process steps are necessary for recognition of continuously spoken words as will presently be described. The continuous speech recognition systems have therefore been bulky and expensive.

An example of the continuous speech recognition systems that are already in practical use, is disclosed in U.S. Pat. No. 4,059,725 issued to Hiroaki Sakoe, the present applicant and assignor to the present assignee. In order to facilitate an understanding of the instant invention, the system will briefly be described in the following.

A continuous speech recognition system of the type revealed in the referenced patent recognizes a sequence of spoken word or words with reference to a predetermined number N of individually spoken words, which are preliminarily supplied to the system as reference words. The word sequence is supplied to the system as an input pattern A given by a time sequence of first through I-th input pattern feature vectors $a_i$ ($i = 1, 2, \ldots, I$) as:

$$A = a_1, a_2, \ldots, a_I. \tag{1}$$

The reference words are selected to cover the words to be recognized by the system and are memorized in the system as first through N-th reference patterns $B^c$ ($c = 1, 2, \ldots, N$). An n-th reference pattern $B^n$ (n being representative of each of c) is given by a time sequence of first through $J^n$-th reference pattern feature vectors $b_j{}^n$ ($j^n = 1, 2, \ldots, J^n$) as:

$$B^n = b_1{}^n, b_2{}^n, \ldots, b_J{}^n. \tag{2}$$

Merely for simplicity of denotation, the vectors will be denoted by the corresponding usual letters, such as $a_i$ and $b_j{}^n$, and the affixes c and n will be omitted unless it is desirable to resort to the more rigorous expressions for some reason or another. The feature vectors $a_i$ and $b_j$ are derived by sampling the input pattern A and the reference patterns B at equally spaced sampling instants. It is therefore possible to understand that the input and the reference pattern feature vectors $a_i$ and $b_j$ are arranged along the respective time axes i and j at equal interval.

For the system disclosed in the above-referenced patent, a fragmentary pattern $A(u, m)$ is defined by:

$$A(u, m) = a_{u+1}, a_{u+2}, \ldots, a_m,$$

where u and m are called a start and an end point of the fragmentary pattern $A(u, m)$. The fragmentary pattern $A(u, m)$ is named a partial pattern in the patent being referred to, equally as the partial patterns that will be described in the following. Obviously:

$$0 \leq u < m \leq I.$$

A group of similarity measures $S(A(u, m), B^c)$ is calculated between each fragmentary pattern $A(u, m)$ and the reference patterns $B^c$. A similarity measure $S(A(u, m), B^n)$ between the fragmentary pattern $A(u, m)$ and each reference pattern $B^n$ is calculated according to, for example:

$$S(A(u, m), B^n) = \max_{j=j(i)} \sum_{i=u+1}^{m} s(i, j), \tag{3}$$

where $j(i)$ represents a monotonously increasing function for mapping or warping the reference pattern time axis j to the input pattern time axis i. Inasmuch as the first and the last feature vectors $a_{u+1}$ and $a_m$ of the fragmentary pattern $A(u, m)$ should be mapped to the first and the last feature vectors $b_1$ and $b_J$ of the reference pattern $B^n$ under consideration:

$$j(u+1) = 1$$

and $$j(m) = J.$$

In Equation (3), $s(i, j)$ represents the scalar product of an i-th input pattern feature vector $a_i$ and a j-th reference pattern feature vector $b_j$ of the reference pattern $B^n$. Namely:

$$s(i, j) = (a_i \cdot b_j)$$

or $$s(i, j^n) = (a_i \cdot b_j{}^n).$$

A partial similarity $S<u, m>$ and a partial recognition result $n<u, m>$ are calculated according to:

$$S<u, m> = {}^{max}{}_c S(A(u, m), B^c)$$

and $$n<u, m> = \arg {}^{max}{}_c S(A(u, m), B^c),$$

for each similarity measure group $S(A(u, m), B^c)$. Groups of similarity measures $S(A(u, m), B^c)$'s are successively calculated for the end point m under consideration, with the start point u varied throughout an interval $U(m)$ given by:

$$m - J - r \leqq u \leqq m - J + r, \quad (4)$$

where r represents a predetermined integer that is selected to be about 30°/o of the shortest one of the reference pattern length or duration (min $J^c$) and is called a window length or width in the art. A group of partial similarities $S<u, m>$'s and another group of partial recognition results $n<u, m>$'s are calculated for such groups of similarity measures $S(A(u, m), B^c)$'s. With the end point m successively shifted towards the input pattern end point I, partial similarities $S<u, m\leqq$'s and partial recognition results $n <u, m>$'s of various groups are stored in memories at addresses specified by u and m. As the case may be, the groups of similarity measures $S(A(u, m), B^c)$'s will be called a set of similarity measures and the fragmentary patterns $A(u, m)$'s having the common end point m and the start points u's which are predetermined relative to the end point m or, more specifically, varied throughout the interval U(m), a set of fragmentary patterns.

On the other hand, it is possible to represent the input pattern A by various concatenations of partial patterns. An x-th partial pattern in each concatenation is a fragmentary pattern $A(u, m)$ having the start and the end points at points $u(x-1)$ and $u(x)$. The number of partial patterns in each concatenation will be designated by y. When the number y is equal to unity, the concatenation is the input pattern A per se. The point $u(x)$ and others for each concatenation are called x-th and like segmentation points. The first through the y-th partial patterns of each concatenation are thus represented by $A(u(0), u(1))$ or $A(0, u(1)), A(u(1), u(2)), \ldots, A(u(x-1), u(x)), \ldots,$ and $A(u(y-1), u(y))$ or $A(u(y-1), I)$. One of the concatenations would be a concatenation of those of the reference patterns B which are representative of the actually spoken word sequence. The segmentation points for such a partial pattern concatenation are named optimum segmentation points and denoted by $u(x)$ $(x=1, 2, \ldots, y)$. The zeroth and the y-th optimum segmentation points $u(0)$ and $u(y)$ are the input pattern start and end points 0 and I.

For each partial pattern concatenation, a sum of the memorized partial similarities $S<u(x-1), u(x)>$'s is calculated. The optimum segmentation points $u(x)$'s are the segmentation points that give a maximum of such sums, namely:

$$\max_{u(x)} \sum_{x=1}^{y} S<u(x-1), u(x)>.$$

Referring to the memorized partial recognition results $n<u, m>$'s by the optimum segmentation points $u(x)$'s, the word sequence is recognized as a concatenation of optimum ones of the reference patterns $n<u(x-1), u(x)>$'s.

It is very desirable to apply the known technique of dynamic programming to calculation of Equation (3). As will later be described in detail with reference to one of nearly ten figures of the accompanying drawing, the algorithm for the dynamic programming is given by a recurrence formula for a recurrence value $g(i, j)$, which is called a recurrence coefficient in the patent cited hereinabove. The recurrence formula may be:

$$g(i, j) = s(i, j) + \max \begin{bmatrix} g(i + 1, j) \\ g(i + 1, j + 1) \\ g(i + 1, j + 2) \end{bmatrix}. \quad (5)$$

For each value of the end point m, the recurrence formula (5) is calculated from $j=J$, successively through $(J-1), (J-2), \ldots,$ and 2, to $j=1$. The initial condition is:

$$g(m, J) = s(m, J).$$

It is sufficient that the value of i be varied only in a window defined by:

$$j+m-j-r \leqq i \leqq j+m-J+r. \quad (6)$$

A subset of similarity measures $S(A(u, m), B^n)$'s for the end point m and the reference pattern $B^n$, both under consideration, and for various start points u's in the interval U(m) defined by Equation (4) is thereby calculated in parallel according to:

$$S(A(u, m), B^n) = g(u+1, 1).$$

A similarity calculator according to the present invention is for carrying out the dynamic programming of the type exemplified above. In the cited patent, the technique of dynamic programming is applied also to maximization of the above-identified sum as regards the segmentation points $u(x)$'s and the number y of the partial patterns $A(u(x-1), u(x))$'s. With this, real time processing is rendered possible for each subgroup of partial similarities $S<u, m>$'s and partial recognition results $n<u, m>$'s derived for each end point m and memorized in the memories with the addresses specified only by the start points u's. The latter technique of dynamic programming is, however, out of scope of the instant invention and will not be described any further.

During calculation of each similarity measure subset $S(A(u, m), B^n)$'s according to the recurrence formula (5), the value of j is varied from J down to 1 as described. For each value of j, the value of i is varied in the window (6). When the reference pattern duration J and the window width r are equal to 20 and 10, respectively, it is necessary to calculate the recurrence formula (5) about four hundred times for each end point m. It is therefore mandatory to calculate the recurrence formula (5) as many as forty thousand times to derive each subgroup of partial similarities $S<u, m>$'s and partial recognition results $n<u, m\leqq$'s when the number N of reference patterns B or words is about 100. For real time processing, the end point m must be shifted towards the input pattern end point I at the sampling period, which is usually about 10 milliseconds. The recurrence formula (5) must therefore be calculated at a rate of four times per microsecond.

In connection with the above, it is worthwhile to note that a major part of calculation of the recurrence formula (5) is for the scalr product $s(i, j)$. This is because each feature vector $a_i$ or $b_j$ is of about ten dimensions, namely, consists of about ten vector components. Multiplication must therefore be carried out about ten times, followed by addition, for calculation of each scalar product $s(i, j)$. On the other hand, comparison is repeated three times for maximization in the recurrence formula (5). The rest of calculation is to add the scalar product $s(i, j)$ and the maximum. The multiplication must therefore be carried out at as high a rate as forty times per microsecond.

It has therefore been unavoidable that the similarity calculator for use in a continuous speech recognition system of the type revealed in the above-cited patent should comprise elements that are operable at high speed and are accordingly expensive. Alternatively, the similarity calculator has had to carry out the calculation in parallel. In any event, the similarity calculator has been bulky and expensive.

Incidentally, the input pattern feature vectors $a_i$ are supplied to a calculator for the scalar product $s(i, j)$ from an input pattern buffer. In order to calculate the recurrence formula (5) in the window (6) with the value of j varied from J down to 1 for each end product m, it has been necessary to make the input pattern buffer hold a plurality of input pattern feature vectors $a_i$ at a time, for example, about $(J+r)$ in number.

SUMMARY OF THE INVENTION

It is therefore an object of the present invention to provide a similarity calculator for use in a pattern recognition system in calculating a similarity measure between an input pattern and each of a predetermined number of reference patterns according to the technique of dynamic programming, with a reduced amount of calculation.

It is another object of this invention to provide a similarity calculator of the type described, which need not be operable at a very high rate.

It is still another object of this invention to provide a similarity calculator of the type described, which is compact not not expensive.

It is a further object of this invention to provide a similarity calculator of the type described, in which an input pattern buffer may hold only one input pattern feature vector at a time.

A similarity calculator to which this invention is applicable is for calculating a set of similarity measures $S(A(u, m), B^c)$'s between every one of a set of fragmentary patterns $A(u, m)$'s of an input pattern A and every one of first through N-th reference patterns $B^c$ (c=1, 2, ..., N). The input pattern A is given by a time sequence of first through I-th input pattern feature vectors $a_i$ (i=1, 2, ..., I). Each set of fragmentary patterns $A(u, m)$'s is defined by an end point m (m being representative of each of i) and a plurality of start points u's predetermined relative to the end point m as those parts of the time sequence which consist of (u+1)-th through m-th input pattern feature vectors $a_{u+1}$ to $a_m$. An n-th reference pattern $B^n$ (n being representative of each of c) is given by a time sequence of first through $J^n$-th reference pattern feature vectors $b_j^n$ ($j^n=1, 2, ..., J^n$).

According to this invention, the similarity calculator comprises input pattern buffer means, a reference pattern memory, control means, reference pattern output means, scalar product calculating means, scalar product buffer means, and recurrence value calculating means.

The input pattern buffer means is for producing the input pattern feature vectors $a_i$ successively in the ascending order, the m-th input pattern feature vector $a_m$ during an m-th relatively long period of time.

The reference pattern memory is for memorizing the reference pattern feature vectors $b_j^c$ of the respective reference patterns $B^c$.

The control means is operatively coupled to the input pattern buffer means for producing a reference pattern specifying signal specifying the reference patterns $B^c$ successively in a predetermined order in the m-th relatively long period, the n-th reference pattern $B^n$ during an n-th period of first through N-th intermediate periods of time, a first set of signals specifying in a first fragment of the n-th intermediate period the first through the $J^n$-th reference pattern feature vectors $b_j^n$, respectively, an integer specifying signal specifying integers 1 through $(J^n+r)$ (r being representative of a predetermined integer) successively in the descending order in a second fragment next succeeding the first fragment in the n-th intermediate period, one integer k (k being representative of each of 1 through $[J^n+r]$) during a k-th period of $J^n+r$-th through first relatively short periods of time, and a second set of signals specifying in each relatively short period in the n-th intermediate period those consecutive ones of the first through the $J^n$-th reference pattern feature vectors $b_j^n$, respectively, which are prescribed relative to the integer k specified during that relatively short period.

The reference pattern output means is connected to the reference pattern memory and responsive to the reference pattern specifying signal and the first-set signals for making the reference pattern memory produce the first through the $J^n$-th reference pattern feature vectors $b_j^n$ in the n-th intermediate period.

The scalar product calculating means is connected to the input pattern buffer means and the reference pattern output means for calculating, in the n-th intermediate period of the m-th relatively long period, scalar products $s(m, j^n)$ of the m-th input pattern feature vector $a_m$ and the respective reference pattern feature vectors $b_j^n$ produced in the meantime.

The scalar product buffer means is connected to the scalar product calculating means and the control means and comprises a plurality of buffer addresses specifiable by the signals of whichever of the first and the second sets for holding the scalar products $s(m, j^n)$ in the buffer addresses specified by the first-set signals and for producing the scalar products $s(m, j^n)$ from the buffer addresses specified by the second-set signals.

The recurrence value calculating means is connected to the scalar product buffer means and responsive to the reference pattern specifying signal, the integer specifying signal, and the second-set signals for carrying out, during the k-th relatively short period in the n-th intermediate period of the m-th relatively long period and for a v-th reference pattern feature vector $b_v$ (v being representative of each $j^n$) specified in the meanwhile by a v-th one of the second-set signals, calculation of a recurrence value $g_k(m, v)$ by the use of the scalar product $s(m, v)$ produced from the buffer address specified by the last-mentioned second-set signal and the recurrence values comprising three recurrence values $g_{k-1}(m-1, v)$'s calculated during the (k-1)-th relatively short period in the n-th intermediate period of the (m-1)-th relatively long period and for three consecutive reference pattern feature vectors $b_v$'s predetermined relative to the v-th reference pattern feature vector $b_v$. The recurrence value calculating means provides the similarity measure set $S(A(u, m), B^c)$'s at the end of the m-th relatively long period.

BRIEF DESCRIPTION OF THE DRAWING

FIG. 5, depicted below FIG. 1, is a time chart for use in describing operation of the similarity calculator shown in FIG. 4;

DESCRIPTION OF THE PREFERRED EMBODIMENTS

Figure 1:
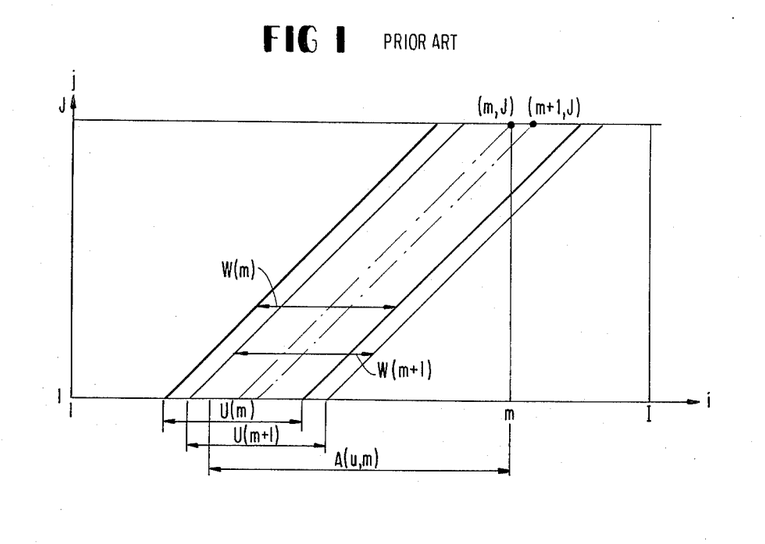
FIG. 1 shows a coordinate plane for use in describing operation of a conventional similarity calculator.

Referring to FIG. 1, operation of a similarity calculator used in U.S. Pat. No. 4,059,725 referred to hereinabove will be described at first for a better understanding of the present invention, in specific conjunction with calculation of the recurrence formula (5) exemplified above. The abscissa is for a time axis i along which a time sequence of first through I-th input pattern feature vectors $a_i$ given as in Equation (1) for an input pattern A are arranged and the ordinate, for another time axis j along which another time sequence of first through J-th reference pattern feature vectors $b_j$ given as in Equation (2) for a reference pattern B are arranged. A similarity calculator resorted to in a continuous speech recognition system disclosed in U.S. Pat. No. 4,049,913 issued to Hiroaki Sakoe, the present applicant and assignor to the instant assignee, is similar in structure and operation.

As described hereinabove, the recurrence formula (5) is for use in calculating a similarity measure subset $S(A(u, m), B^n)$'s between a set of fragmentary patterns $A(u, m)$ and a particular reference pattern $B^n$. The fragmentary pattern set $A(u, m)$ have a common end point m and start points u's predetermined relative to the end point m. More particularly, the start points u's are in an interval U(m) given by Equation (4). At first, recurrence values g(m, J) at a point (m, J) on the i-j coordinate plane is given the initial scalar product s(m, J). The value of j is decreased down to unity from J through each of values (J−1), (J−2), ..., and 2, when the similarity measure subset $S(A(u, m), B^n)$'s is given by the recurrence values g(u+1, 1). In the meantime, the value of i is varied in a window W(m) defined by Equation (6). The values of i and j are thus varied at least in a parallelogram having four sides given by:

$j = 1,$ $j = J,$ $j = i - m + J - r,$ and $j = i - m + J + r,$ except a triangle indicated by hatches.

After a similarity measure set $S(A(u, m), B^c)$'s is calculated for the respective reference patterns $B^c$, the recurrence formula (5) is calculated again for the particular reference pattern $B^n$ with the end point m shifted to another end point (m+1) to provide another similarity measure subset $S(A(u, m+1), B^n)$'s. The calculation is now for each value of i and j in another window W(m+1). While the recurrence formula (5) is calculated in the window W(m), the scalar products s(i, j)'s are calculated also in the window W(m). When the recurrence formula (5) is calculated in the other window W(m+1), the scaler products s(i, j)'s are calculated also in that window W(m+1). It is now understood that most of calculation of the scalar products s(i, j)'s in the latter window W(m+1) is mere repetition of the calculation in the former window W(m).

Figure 2:
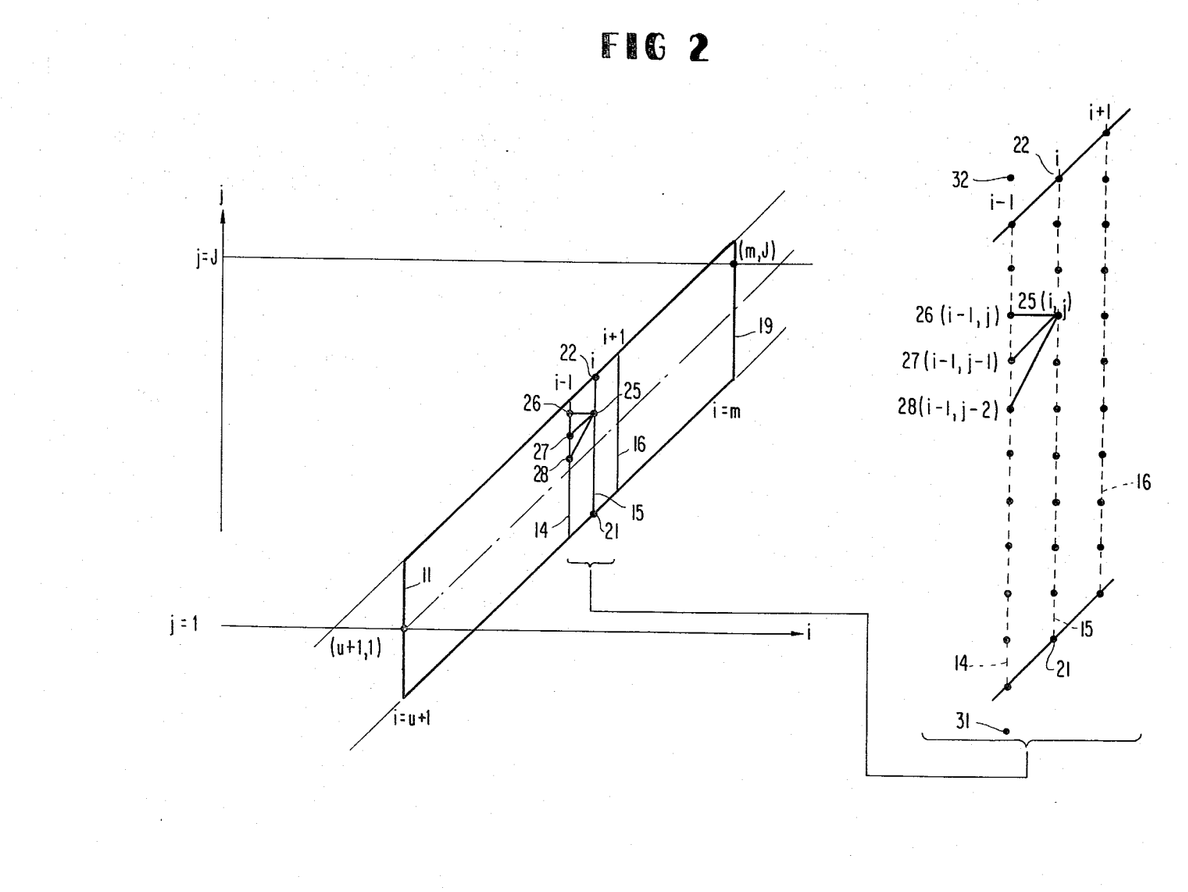
FIG. 2 shows the coordinate plane for use in describing the principles of operation of a similarity calculator according to the instant invention.

Referring now to FIG. 2, a parallelogram for calculation of the recurrence formula (5) for each end point m is depicted with attention paid to the start point u rather than to the end point m. The parallelogram is divided into a plurality of stages 11, ..., 14, 15, 16, ..., and 19 where the value of i is equal to (u+1), ..., (i−1), i, (i+1), ..., and m. Let the recurrence values g(i, j)'s, (2r+1) or R in number, be calculated in each stage by the use of another conventional recurrence formula:

$$g(i, j) = s(i, j) + \max \begin{matrix} g(i-1, j) \\ g(i-1, j-1) \\ g(i-1, j-2) \end{matrix}. \quad (5')$$

The initial condition is:

$$g(u+1, 1) = s(u+1, 1). \quad (7)$$

The similarity measure subset $S(A(u, m), B^n)$'s is given by the recurrence values g(m, J)'s with the start point u varied in the interval U(m).

Referring more particularly to FIG. 2, the recurrence values g(i, j)'s are calculated in the stage 15, where the value of i is equal to i, with the value of j varied from an initial point 21 or (i, i−m+J−r) to an ultimate point 22 or (i, i−m+J+r) successively through intermediate points, such as 25 or (i, j). When the recurrence formula (5') is used, the recurrence value g(i, j) at an intermediate point 25 is equal to a sum of a scalar product s(i, j) at that point 25 and the maximum of three recurrence values g(i−1, j), g(i−1, j−1), and g(i−1, j−2) previously calculated at points 26, 27, and 28 in the stage 14 where the value of i is equal to (i−1). It is therefore necessary that the previously calculated recurrence values g(i−1, j)'s be memorized in a memory. On calculating the recurrence values g(i, i−m+J−r) and g(i, i−m+J+r) at the initial and the ultimate points 21 and 22, no recurrence values are previously calculated at points 31 and 32 in the stage 14. Under the circumstances, the maximum is decided as regards only two previously calculated values. Alternatively, a sufficiently small value (−∞) may be stored in the memory as each of the recurrence values at the points 31 and 32. When calculation is shifted to the stage 16 where the value of i is equal to (i+1), the recurrence values g(i−1, j)'s calculated in the stage 14 are no more necessary. The calculation, however, gives only one similarity measure $S(A(u, m), B^n)$ rather than the similarity measure subset $S(A(u, m), B^n)$'s between the particular reference pattern $B^n$ and the respective fragmentary patterns $A(u, m)$'s having the start points u's in the interval U(m).

Figure 3:
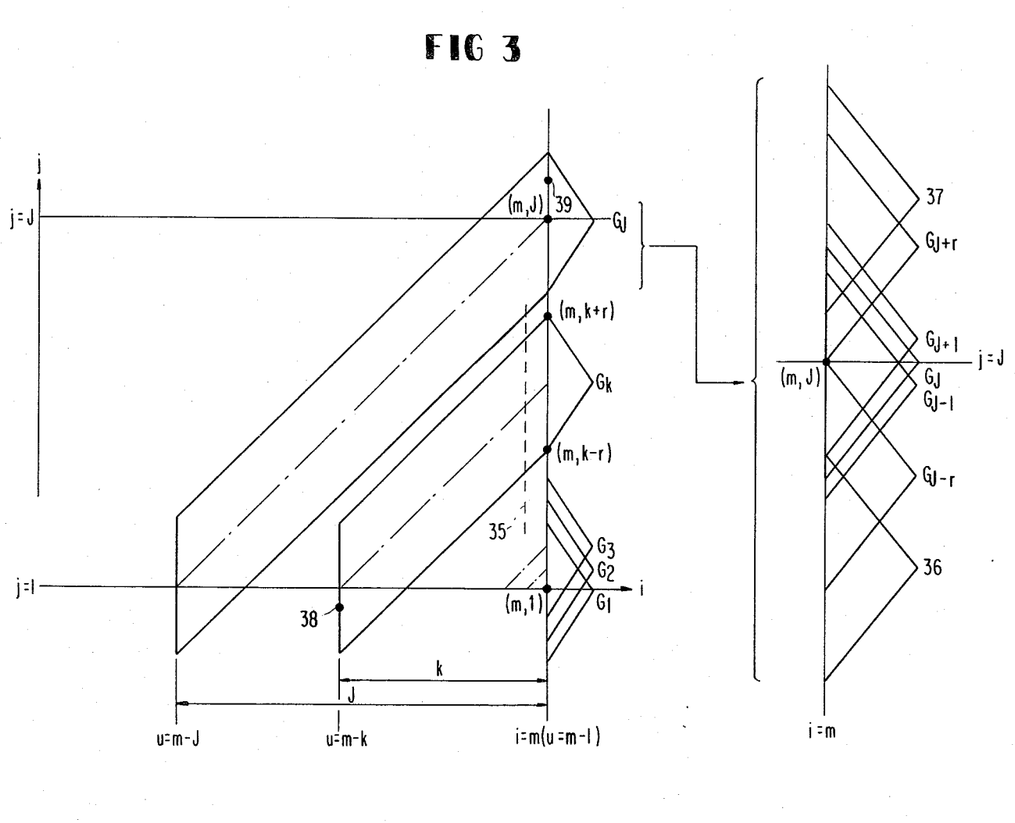
FIG. 3 shows the coordinate plane for use in describing operation of a similarity calculator according to an embodiment of this invention.

Turning to FIG. 3, let a similarity calculator comprise first, ..., k-th, ..., J-th, and other registers $G_1$, $G_2$, $G_3$, ..., $G_k$, ..., $G_J$, .... During an m-th period of time i = m in which the recurrence values g(m, j)'s are calculated, the first register $G_1$ is loaded with a first set of recurrence values $g_1(m, j)$'s for a first fragmentary pattern $A(m-1, m)$ having a start and an end point at $(m-1)$ and m. In general, the k-th register $G_k$ is loaded with a k-th set of recurrence values $g_k(m, j)$'s, R or $(2r+1)$ in number, for a k-th fragmentary pattern $A(m-k, m)$. The J-th register $G_J$ is loaded with a J-th set of recurrence values $g_J(m, j)$'s for a J-th fragmentary pattern $A(m-J, m)$. Incidentally, the first fragmentary pattern $A(m-1, m)$ is nothing but the m-th input pattern feature vector $a_m$.

As will readily be understood from a dashed line 35, the previous recurrence values used in calculating the k-th set of recurrence values $g_k(m, j)$'s according to the recurrence formula (5') are the recurrence values $g_{k-1}(m-1, j)$'s calculated for a $(k-1)$-th fragmentary pattern $A(m-k, m-1)$ or $A(m-1-[k-1], m-1)$ during a next previous or $(m-1)$-th period and stored in a $(k-1)$-th register $G_{k-1}$ (not shown) before start of calculation of the recurrence values $g(m, j)$'s in the m-th period. It is therefore possible to calculate the k-th recurrence value set $g_k(m, j)$'s during the m-th period by the use of the $(k-1)$-th recurrence value set $g_{k-1}(m-1, j)$'s calculated in the $(m-1)$-th period and stored in the $(k-1)$-th register $G_{k-1}$. The recurrence formula (5') is therefore rewritten into a novel recurrence formula:

$$g_k(m,j) = s(m,j) + \max \begin{bmatrix} g_{k-1}(m-1,j) \\ g_{k-1}(m-1,j-1) \\ g_{k-1}(m-1,j-2) \end{bmatrix} \quad (8)$$

On calculating the novel recurrence formula (8), the contents of the $(k-1)$-th register $G_{k-1}$ are used to calculate the recurrence values $g_k(m, j)$'s to be stored in the k-th register $G_k$. It is therefore desirable for effective use of the registers $G_1, \ldots, G_k, \ldots, G_J, \ldots$ that the contents of a greater-numbered registers be dealt with earlier, with the initial condition set in the first register $G_1$.

It is possible to give the initial condition by a set of equations. In this connection, it should be noted that the first register $G_1$ is for the first fragmentary pattern $A(m-1, m)$ having the start point at $(m-1)$. One of the equations is obtained, by putting $u=m-1$ in Equation (7), as:

$$g_1(m, 1) = s(m, 1). \quad (9A)$$

Others are for $j \neq 1$ and are expressed as:

$$g_1(m, j) \quad \infty. \quad (9B)$$

The latter relation is necessary is order to satisfy $j(m) = 1$, which equation is derived by putting $u = m - 1$ in the equation $j(u+1) = 1$ introduced in connection with Equation (3). In other words, Equation (9B) is necessary in fixing the initial point at (m, 1).

Referring more specifically to FIG. 3, it is understood that the recurrence values $g_k(m, J)$'s are stored in the $(J-r)$-th through the $(J+r)$-th registers $G_{J-r}$ to $G_{J+r}$. Inasmuch as the k-th register $G_k$ is for the k-th fragmentary pattern $A(m-k, m)$, the registers $G_{J+r}$ to $G_{J-r}$ are for the $(J+r)$-th through the $(J-r)$-th fragmentary patterns $A(m-j-r, m)$ to $A(m-J+r, m)$ having a common end point m and start points u's in the interval U(m) given by Equation (4). The similarity measure subset $S(A(u, m), B^n)$'s is therefore given by the recurrence values $g_k(m, J)$'s. The registers $G_k$'s where the value of k is less than $(J-r)$ are not loaded with the similarity measure subset $S(A(u, m), B^n)$'s. These registers, such as indicated at 36, are nevertheless indispensable for holding the recurrence values $g_k(m, j)$'s. On the other hand, registers exemplified at 37, namely, for the value of k greater than $(J+r)$, are unnecessary. The necessary registers $G_k$'s are therefore for:

$$1 \leq k \leq J + r.$$

It would have also been understood that such registers are necessary for each of the reference patterns $B^c$ in order to retain the similarity measure set $S(A(u, m), B^c)$'s in parallel. The registers will therefore be designated by $G_k{}^c$. The number of registers $G_k{}^n$ for the n-th reference pattern $B^n$ should be equal to $(J^n + r)$.

It is now understood that the scalar products $s(m, j^c)$ for use in calculating a similarity measure set $S(A(u, m), B^c)$'s for a set of fragmentary patterns $A(u, m)$'s having a common end point m and a plurality of start points u's in an interval U(m) are calculated according to this invention between the m-th input pattern feature vector $a_m$ and the reference pattern feature vectors $b_j{}^c$ of the respective reference patterns $B^c$. On calculating each similarity measure subset $S(A(u, m), B^n)$'s, the scalar products $s(m, j^n)$ may be stored in a buffer at a plurality of buffer addresses specifiable by the serial numbers $j^n$ of the reference pattern feature vectors $b_j{}^n$ for repeated use during calculation of the recurrence values $g_{J+r}(m, j^n)$ through $g_1(m, j^n)$. The scalar products at points where no reference pattern feature vectors are present, such as at points 38 and 39, need not be calculated but may be given a sufficiently small value $(-\infty)$. The number of times of calculation is therefore reduced to 1/R of that which has been necessary. It is consequently possible to calculate the scalar products $s(m, j^c)$ at a rate slower by a factor of R. The similarity calculator is thereby rendered compact and inexpensive.

Figure 4:
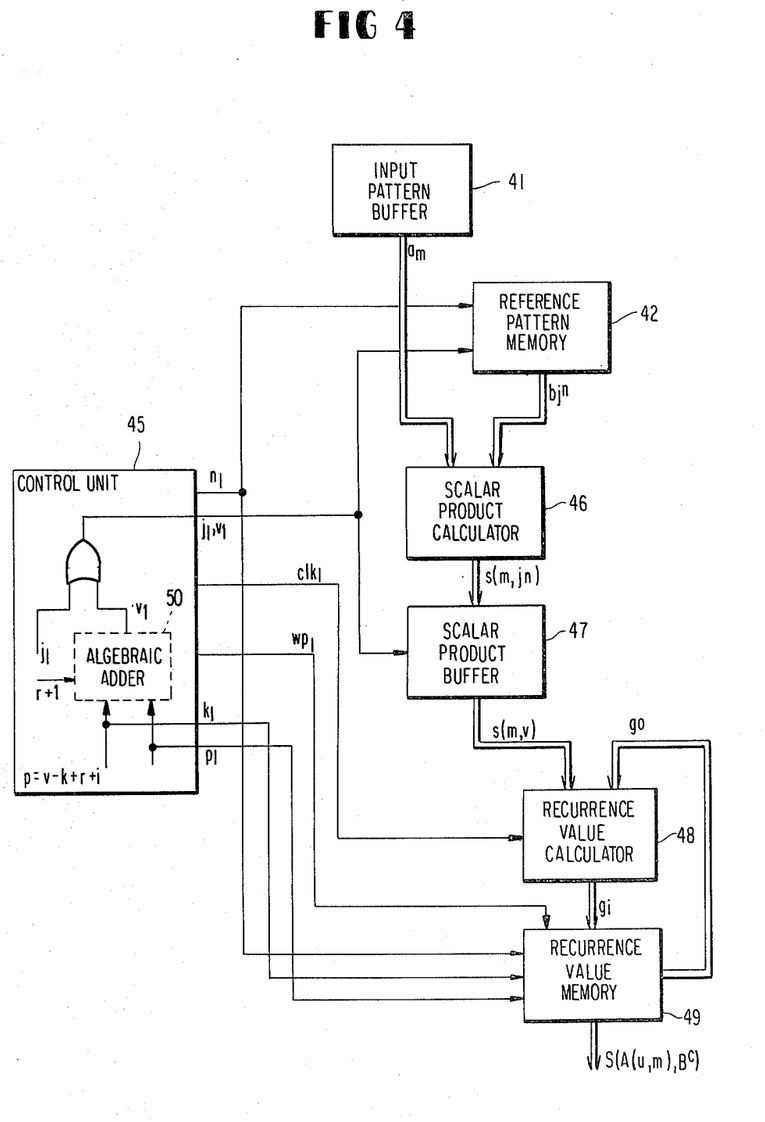
FIG. 4 is a block diagram of a similarity calculator according to a preferred embodiment of this invention.
Figure 5:
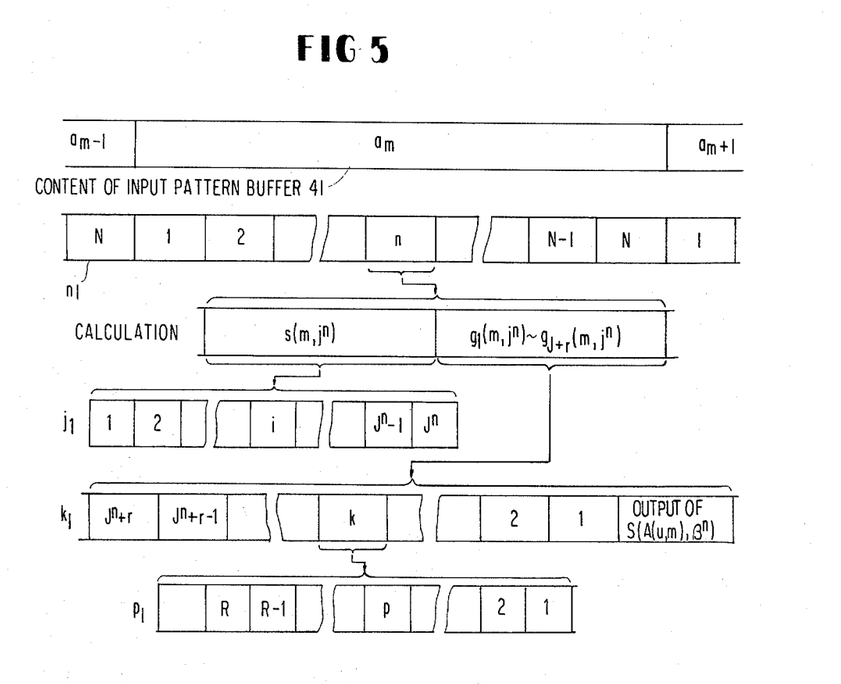

Referring now to FIGS. 4 and 5, a similarity calculator according to a preferred embodiment of this invention comprises an input pattern buffer 41 for producing the input pattern feature vectors $a_i$ successively in the ascending order, the m-th input pattern feature vector $a_m$ during an m-th relatively long period of time. A reference pattern memory 42 is for memorizing the reference pattern feature vectors $b_j{}^c$ of the respective reference patterns $B^c$.

A control unit 45 is operatively coupled to the input pattern buffer 41 for producing a reference pattern specifying signal $n_1$ specifying the reference patterns $B^c$ successively in a predetermined order in the m-th relatively long period, the n-th reference pattern $B^n$ during an n-th period of first through N-th intermediately long periods of time, a first set of signals $j_1$ specifying the first through the $J^n$-th reference pattern feature vectors $b_j{}^n$ successively in a preselected order in a first fragment of the n-th intermediate period, an integer specifying signal $k_1$ specifying integers 1 through $(J^n + r)$ successively in the descending order in a second fragment next succeeding the first fragment in the n-th intermediate period, one integer k during a k-th period of $(J^n+r)$-th through first relatively short periods of time, and a second set of signals $v_1$ specifying in each relatively short period in the n-th intermediate period those consecutive ones of the first through the $J^n$-th reference pattern feature vectors $b_j{}^n$ successively in a prescribed order which are predetermined relative to the integer k specified in that relatively short period. The second-set signals $v_1$ are thus for specifying the serial numbers j of the reference pattern feature vectors $b_j$, namely, the ordinate in FIG. 3, and are not materially different from the first-set signals $j_1$ except that the second-set signals $v_1$ are produced in the second fragment of the n-th intermediate period and are varied relative to the integers k's specified during the respective relatively short periods. When varied to specify the reference pattern feature vectors $b_j$ in the descending order, the second-set signals $v_1$ specify the J-th through the first reference pattern feature vectors $b_J$ to $b_1$ in a staggering manner downwardly along the stages 19, ..., 16, 15, 14, ..., and 11 depicted in FIG. 3.

The control unit 45 is connected to the reference pattern memory 42 so as to make the latter successively produce, in the n-th intermediate period during which the n-th reference pattern $B^n$ is specified by the reference pattern specifying signal $n_1$, the first through the $J^n$-th reference pattern feature vectors $b_j^n$ in response to the respective first-set signals $j_1$. A scalar product calculator 46 is connected to the input pattern buffer 41 and the reference pattern memory 42 for calculating, in the n-th intermediate period of the m-th relatively long period, scalar products $s(m, j^n)$ of the m-th input pattern feature vector $a_m$ and the respective reference pattern feature vectors $b_j^n$ produced in the meantime. A scalar product buffer 47 is connected to the scalar product calculator 46 and the control unit 45 and comprises a plurality of buffer addresses specifiable by the signals $j_1$ and $v_1$ of either of the first and the second sets. The scalar product buffer 47 is for holding the scalar products $s(m, j^n)$ in the buffer addresses specified by the first-set signals $j_1$ in response to write-in pulses following the respective first-set signals $j_1$ and for producing the scalar products $s(m, j^n)$ from the buffer addresses specified by the second-set signals $v_1$.

A combination of a recurrence value calculator 48 and a recurrence value memory 49 is connected to the scalar product buffer 47 and responsive to the reference pattern specifying signal $n_1$, the integer specifying signal $k_1$, and the second-set signals $v_1$. In the similarity calculator being illustrated, the control unit 45 produces a third-set signals $p_1$ related to the second-set signals $v_1$ as will presently be described. During the k-th relatively short period in the n-th intermediate period of the m-th relatively long period and for a v-th reference pattern feature vector $b_v$ specified in the meanwhile by a v-th one of the second-set signals $v_1$, the combination calculates a recurrence value $g_k(m, v)$ by the use of a scalar product $s(m, v)$ produced from the buffer address specified by the last-mentioned second-set signal $v_1$ and the recurrence values comprising three recurrence values $g_{k-1}(m, v)$'s calculated during the (k−1)-th relatively short period in the n-th intermediate period of the (m−1)-th relatively long period and for three consecutive reference pattern feature vectors $b_v$'s, such as $b_v$, $b_{v-1}$, and $b_{v-2}$, which are predetermined relative to the v-th reference pattern feature vector $b_v$. As described with reference to FIG. 3, the combination produces the similarity measure set $S(A(u, m), B^c)$'s at the end of the m-th relatively long period, with the recurrence value memory 49 made to serve as the registers $G_k^c$.

Figure 6:
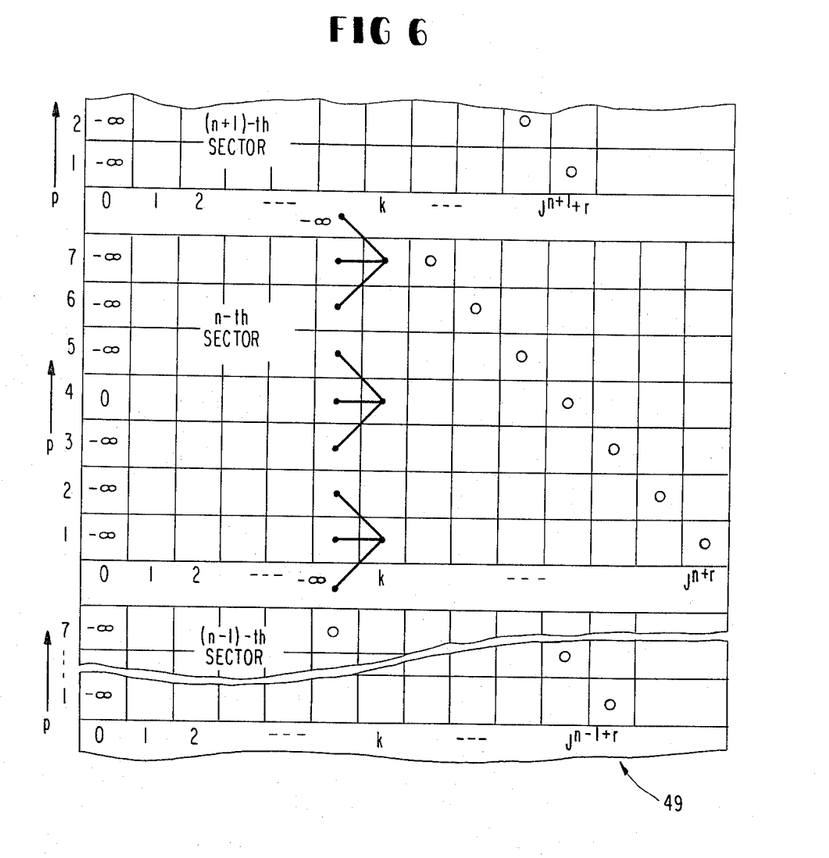
FIG. 6 shows a recurrence value memory for use in the similarity calculator illustrated in FIG. 4.

Referring to FIG. 6 in addition to FIGS. 4 and 5, the recurrence value memory 49 may comprise first through N-th sectors specifiable by the reference pattern specifying signal $n_1$. An n-th sector is specified simultaneously with the n-th reference pattern $B^n$. The n-th sector comprises zeroth through $(J^n+r)$-th stages, among which the first through the $(J^n+r)$-th stages are specifiable directly by the integer specifying signal $k_1$. The zeroth stage is specified only by a read-out circuit to be described later. Each stage, including the zeroth stage, comprises first through R-th memory addresses in correspondence to the interval U(m) given by Equation (4). The zeroth stage is for permanently storing zero in the $(r+1)$-th memory address and a sufficiently small value $(-\infty)$ in each of the first through the r-th and the $(r+2)$-th through the R-th memory addresses. This is for making it possible to readily set the initial condition given by Equations (9A) and (9B) in the memory 49. In order to directly specify the memory addresses, the third-set signals $p_1$ are made to specify integers 1 through R in each relatively short period specified by the integer specifying signal $k_1$. An interval of time may be left in each relatively short period after the integers 1 through R are specified. Merely for simplicity of illustration, the window width r is assumed in FIG. 6 to be three. Also, the third-set signals $p_1$ are made to specify the first through the R-th memory addresses in the reversed order in FIG. 5.

As will shortly become clear, the first through the $(J^c+r)$-th stages of the first through the N-th sectors are for storing in the m-th relatively long period those recurrence values $g_k(m, v)$'s in the respective memory addresses, which are successively calculated in the meanwhile according to the novel recurrence formula (8) with the initial condition (9A) and (9B) approximately satisfied. The recurrence values $g_{J+r}(m, v)$'s through $g_1(m, v)$'s calculated for each reference pattern $B^n$ in the m-th relatively long period are successively substituted for the corresponding recurrence values $g_{J+r}(m-1, v)$'s through $g_1(m-1, v)$'s calculated in the n-th intermediate period of the (m−1)-th relatively long period and stored in the respective addresses of the sector specified simultaneously with that reference pattern $B^n$. Such recurrence values $g_k(m, v)$'s to be stored in the k-th stage in the m-th relatively long period will be designated by $g_k(p)$ by the use of the memory addresses p's rather than the serial numbers j or v's of the reference pattern feature vectors $b_j^n$. The serial numbers (m−1) and m of the input pattern feature vectors $a_{m-1}$ and $a_m$ under consideration are omitted. Obviously:

$$p = v - k + r + 1. \tag{10}$$

It is therefore preferred that the control unit 45 should comprise a counter symbolized by a line labelled "$p_1$" for producing the third-set signals $p_1$ and an algebraic adder 50 for producing the second-set signals $v_1$ by the use of the third-set signals $p_1$ and the integer specifying signal $k_1$ so that the second-set signals $v_1$ produced in the n-th intermediate period may specify the first through the $J^n$-th reference pattern feature vectors $b_v$'s of the n-th reference pattern $B^n$ stepwise according to:

$$v = p + k - r - 1.$$

The novel recurrence formula (8) is now rewritten into:

$$g_k(p) = s(m, p + k - r - 1) + \max \begin{bmatrix} g_{k-1}(p + 1) \\ g_{k-1}(p) \\ g_{k-1}(p - 1) \end{bmatrix}, \quad (8')$$

where the recurrence values to be maximized are those calculated during the $(m-1)$-th relatively long period.

Figure 7:
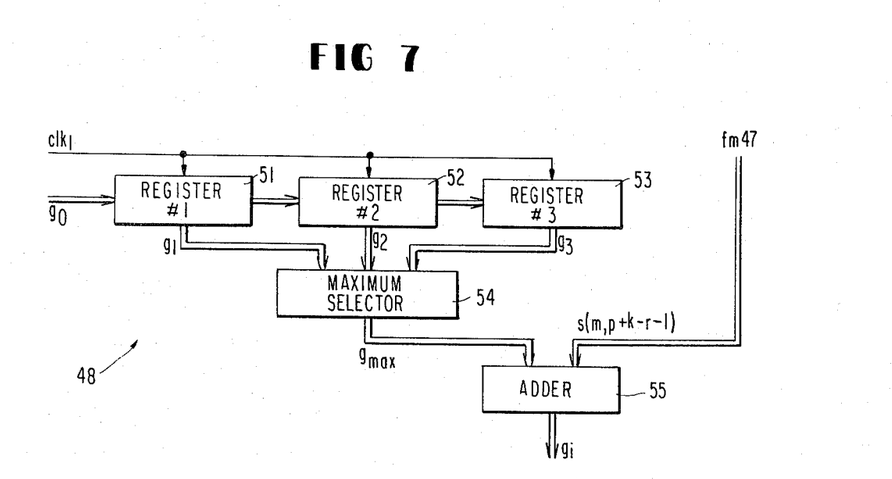
FIG. 7 shows in blocks a recurrence value calculator for use in the similarity calculator shown in FIG. 4.
Figure 8:
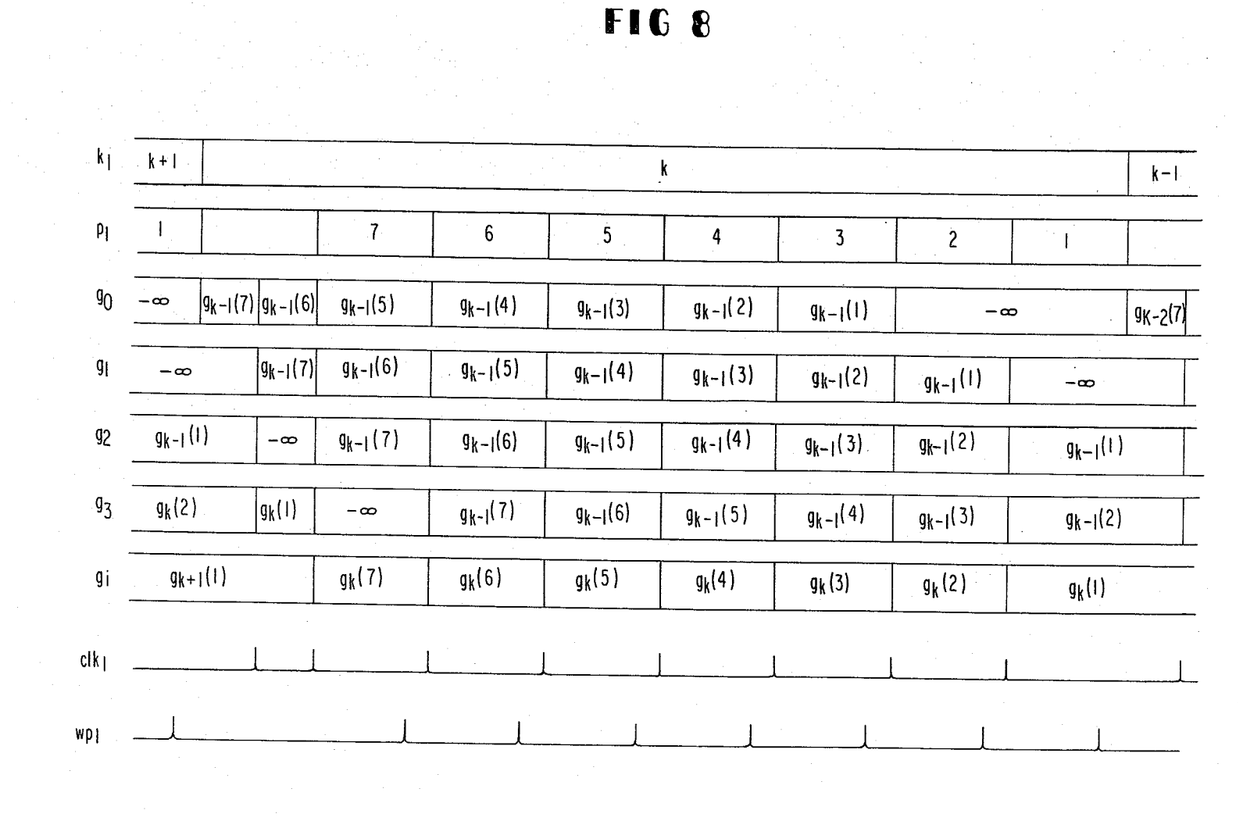
FIG. 8 is a time chart for use in describing operation of the recurrence value memory and calculator illustrated in FIGS. 6 and 7.

Referring to FIGS. 7 and 8 in addition to FIGS. 4 through 6, the recurrence value calculator 48 may comprise first through third registers 51, 52, and 53 for supplying first through third content signals $g_1$, $g_2$, and $g_3$ to a maximum selector 54, respectively. At the end of the relatively short period during which the $(k+1)$-th stage of the recurrence value memory 49 is specified by the integer specifying signal $k_1$, the first register 51 is loaded with a sufficiently small value $(-\infty)$ as will presently become clear. As soon as the k-th stage is specified, a read-out circuit depicted merely by a line labelled "$k_1$" makes the memory 49 supply the first register 51 with an output signal $g_o$ representative of a recurrence value $g_{k-1}(7)$ calculated in the $(m-1)$-th relatively long period and stored in the seventh memory address of the $(k-1$-th stage. The control unit 45 produces a sequence of clock pulses $clk_1$. Responsive to each clock pulse $clk_1$, the contents of the first and the second registers 51 and 52 are moved to the second and the third registers 52 and 53, respectively. Before the seventh memory address is specified by one of the third-set signals $p_1$, one of such clock pulses $clk_1$ is produced. The first and the second registers 51 and 52 make the first and the second content signals $g_1$ and $g_2$ represent the recurrence value $g_{k-1}(7)$ and the sufficiently small value. The read-out circuit makes the output signal $g_o$ represent another recurrent value $g_{k-1}(6)$. When the seventh memory address is specified, another of the clock pulses $clk_1$ is produced. The read-out circuit makes the output signal $g_o$ represent still another recurrence value $g_{k-1}(5)$. The first through the third content signals $g_1$, $g_2$, and $g_3$ are now representative of the recurrence values $g_{k-1}(6)$ and $g_{k-1}(7)$ and the sufficiently small value.

The maximum selector 54 selects the maximum of the recurrence values $g_{k-1}(6)$ and $g_{k-1}(7)$ and the sufficiently small value to supply an adder 55 with a maximum signal $g_{max}$ representative of the selected maximum. In the meantime, the second-set signals $v_1$ are made to represent $(k+r)$. The scalar product buffer 47 supplies a scalar product $s(m, k+r)$ to the adder 55. The adder 55 calculates the recurrence formula (8') and supplies the recurrence value memory 49 with an input signal $g_i$ representative of a new recurrence value $g_k(7)$. The control unit 45 produces a write-in pulse $wp_1$ a little before an instant at which the third-set signals $p_1$ are switched from one value to another. The new recurrence value $g_k(7)$ calculated in the m-th relatively long period is substituted for the recurrence value $g_k(7)$ calculated in the $(m-1)$-th relatively long period and stored in the seventh memory address of the k-th stage.

When the second memory address is specified by one of the third-set signals $p_1$ that is representative of 2, the read-out circuit makes the memory 49 produce a sufficiently small value $(-\infty)$ as the output signal $g_o$. As a result, the first content signal $g_1$ represents the sufficiently small value when one of the clock pulses $clk_1$ is produced upon turn into p=1 of the third-set signals $p_1$ from p=2. This is in order to calculate the recurrence formula (8') by neglecting the recurrence value $g_{k-1}(0)$ that is not defined.

As the integers k's specified by the integer specifying signal $k_1$ are successively decreased towards unity, the second-set signals $v_1$ may indicate either zero or negative integers. Under the circumstances, the scalar product $s(m, v)$ is given a sufficiently small value $(-\infty)$. When the first stage is eventually specified, the recurrence formula (8') is calculated with reference to the recurrence values $g_0(p)$'s permanently stored in the zeroth stage. The new recurrence values $g_1(p)$'s calculated and stored in the seventh through the first memory addresses of the first stage are:

$-\infty$, $-\infty$, $s(m, 2)$, $s(m, 1)$, $-\infty$, $-\infty$, and $-\infty$, respectively. These recurrence values $g_1(p)$'s approximately satisfy the initial condition given by Equations (9A) and (9B).

While this invention has thus far been described in specific conjunction with a preferred embodiment thereof, it is now possible for those skilled in the art to implement the principles of this invention in various forms of embodiments. First of all, this invention is applicable to pattern recognition systems other than the continuous speech recognition systems. The first-set signals $j_1$ may specify the reference pattern feature vectors $b_j$ in parallel. This applies to other signals produced by the control unit 45 except for an input pattern feature vector specifying signal (not shown) to be supplied to the input pattern buffer 41 and for the integer specifying signal $k_1$. Even the reference pattern specifying signal $n_1$ may specify the reference pattern $B^c$ in parallel if the scalar product buffer 47 comprises first through N-th sectors for the scalar products $s(m, j^c)$ calculated for the respective reference patterns $B^c$. Various recurrence formulae are already known, which may be used instead of the formula (5'). Above all, four or more previously calculated recurrence values may be used in the recurrence formula. An Euclidean distance or the like may be substituted for the scalar product $s(m, v)$, with the minimum selected instead of the maximum according to the circumstances. It is preferred that the similarity measures of each subset $S(A(u, m), B^n)$'s be produced from the recurrence value memory 49 in the interval left in each relatively short period. The recurrence value calculator 48 may be composed of a known microprocessor, such as that described in a data book published 1976 by Advanced Micro Devices, Inc., California, U. S. A., under the title of "The Am2900 Family Data Book," with reference to FIG. 1 (page 7).

What is claimed is:

1. A similarity calculator for calculating a set of similarity measures $S(A(u, m), B^c)$'s between every one of a set of fragmentary patterns $A(u, m)$'s of an input pattern A and every one of first through N-th reference patterns $B^c$ (c=1, 2, ..., N), said input pattern A being given by a time sequence of first through I-th input pattern feature vectors $a_i$ (i=1, 2, ..., I), said set of fragmentary patterns $A(u, m)$'s being defined by an end point m (m being representative of each of i) and a plurality of start points u's predetermined relative to the end point m as those parts of said time sequence which consist of $(u+1)$-th through m-th input pattern feature vectors $a_{u+1}$ to $a_m$, an n-th reference pattern $B^n$ (n being representative of each of c) being given by a time sequence of first through $J^n$-th reference pattern feature vectors $b_j^n$ ($j^n=1, 2, ..., J^n$), said similarity calculator comprising:

input pattern buffer means for producing said input pattern feature vectors $a_i$ successively in the ascending order, the m-th input pattern feature vector $a_m$ during an m-th relatively long period of time;

a reference pattern memory for memorizing the reference pattern feature vectors $b_j^c$ of the respective reference patterns $B^c$;

control means operatively coupled to said input pattern buffer means for producing a reference pattern specifying signal specifying said reference patterns $B^c$ successively in a predetermined order in the m-th relatively long period, the n-th reference pattern $B^n$ during an n-th period of first through N-th intermediate poriods of time, a first set of signals specifying in a first fragment of the n-th intermediate period the first through the $J^n$-th reference pattern feature vectors $b_j^n$, respectively, an integer specifying signal specifying integers 1 through $(J^n+r)$ (r being representative of a predetermined integer) successively in the descending order in a second fragment next succeeding the first fragment in the n-th intermediate period, one integer k (k being representative of each of 1 through $[J^n+r]$) during a k-th period of $(J^n+r)$-th through first relatively short periods of time, and a second set of signals specifying in each relatively short period in the n-th intermediate period those consecutive ones of the first through the $J^n$-th reference pattern feature vectors $b_j^n$, respectively, which are prescribed relative to the integer k specified during said each relatively short period;

reference pattern output means connected to said reference pattern memory and respective to the reference pattern specifying signal and the first-set signals for making said reference pattern memory produce the first through the $J^n$-th reference pattern feature vectors $b_j^n$ in the n-th intermediate period;

scalar product calculating means connected to said input pattern buffer means and said reference pattern output means for calculating, in the n-th intermediate period of the m-th relatively long period, scalar products $(a_m \cdot b_j^n)$ of the m-th input pattern feature vector $a_m$ and the respective reference pattern feature vectors $b_j^n$ produced in the meantime;

scalar product buffer means connected to said scalar product calculating means and said control means and comprising a plurality of buffer addresses specifiable by the signals of whichever of the first and the second sets for holding the scalar products $(a_m \cdot b_j^n)$ in the buffer addresses specified by the first-set signals and for producing the scalar products $(a_m \cdot b_j^n)$ from the buffer addresses specified by the second-set signals; and recurrence value calculating means connected to said scalar product buffer means and responsive to the reference pattern specifying signal, the integer specifying signal, and the second-set signals for carrying out, during the k-th relatively short period in the n-th intermediate period of the m-th relatively long period and for a v-th reference pattern feature vector $b_v$ (v being representative of each of $j^n$) specified in the meanwhile by a v-th one of the second-set signals, calculation of a recurrence value $g_k(m, v)$ by the use of the scalar product $(a_m \cdot b_v)$ produced from the buffer address specified by the last-mentioned second-set signal and the recurrence values comprising three recurrence values $g_{k-1}(m-1, v)$'s calculated during the $(k-1)$-th relatively short period in the n-th intermediate period of the $(m-1)$-th relatively long period and for three consecutive reference pattern feature vectors $b_v$'s predetermined relative to the v-th reference pattern feature vector $b_v$, said recurrence value calculating means providing the similarity measure set $S(A(u, m), B^c)$'s at the end of the m-th relatively long period.

2. A similarity calculator as claimed in claim 1, wherein:

said control means comprises:

means for producing a third set of signals specifying integers 1 through $(2r+1)$ in the k-th relatively short period; and means for calculating algebraic sums equal to the integers p's (p being representative of each of 1 through $[2r+1]$) plus the integer k minus the predetermined integer r minus one to make said second-set signals represent the algebraic sums in the k-th relatively short period;

said recurrence value calculating means comprising:

a recurrence value memory comprising first through N-th sectors specifiable by the reference pattern specifying signal, the n-th sector specified during the n-th intermediate period comprising first through $(J^n+r)$-th stages specifiable by the integer specifying signal, the k-th stage specified during the k-th relatively short period in the n-th intermediate period comprising first through $(2r+1)$-th memory addresses specifiable by the respective third-set signals and being for storing the recurrence values $g_k(m, v)$'s calculated in the meanwhile and for the v-th reference pattern feature vectors $b_v$'s specified by the second-set signals representative of the algebraic sums;

recurrence value output means connected to said recurrence value memory and responsive to the reference pattern specifying signal, the integer specifying signal, and the third-set signals produced in the m-th relatively long period for making said recurrence value memory produce the recurrence values $g_{k-1}(m-1, v)$'s calculated in the $(m-1)$-th relatively long period and stored in at least three consecutive memory addresses in the $(k-1)$-th stage of the n-th sector when the p-th memory address in the k-th stage of the n-th sector is specified in the m-th relatively long period, said at least three consecutive memory addresses including the p-th memory address;

a recurrence value calculator connected to said scalar product buffer means and said recurrence value output means for selecting a maximum of the recurrence values $g_{k-1}(m-1, v)$'s produced when the p-th memory address is specified in the k-th stage of the n-th sector in the m-th relatively long period and for calculating a sum of said maximum and the scalar product $(a_m \cdot b_v)$ produced from the buffer address specified by that one of the second-set signals which is representative of the algebraic sum calculated for the integer p, said recurrence value calculator thereby providing a new recurrence value $g_k(m, v)$ given by the sum calculated thereby; and input means connected to said recurrence value memory and said recurrence value calculator and responsive to the reference pattern specifying signal, the integer specifying signal, and the third-set signals for substituting the new recurrence value $g_k(m, v)$ for the recurrence value $g_k(m-1, v)$ stored in the p-th memory address in the k-th stage of the n-th sector in the (m−1)-th relatively long period, said recurrence value memory thereby storing the similarity measure set $S(A(u, m), B^c)$'s at the end of the m-th relatively long period.

* * * * *

UNITED STATES PATENT AND TRADEMARK OFFICE
CERTIFICATE OF CORRECTION

PATENT NO. : 4,319,221
DATED : March 9, 1982
INVENTOR(S) : Miroaki SAKOE

It is certified that error appears in the above—identified patent and that said Letters Patent is hereby corrected as shown below:

Column 3, line 13, delete "$\leqq$'s" and insert -- >'s -- ;

line 42, delete "u(x)" and insert -- $\hat{u}(x)$ -- ;

delete "y)" and insert -- $\hat{y})$ -- ; delete "y-th" and insert -- $\hat{y}$-th -- ;

line 43, delete "u(0)" and insert -- $\hat{u}(0)$ -- ;

delete "u(y)" and insert -- $\hat{u}(y)$ -- ;

line 48, delete "u(x)'s" and insert -- $\hat{u}(x)$'s -- ;

line 56, delete "u(x)'s" and insert -- $\hat{u}(x)$'s -- ;

line 58, delete "n<u(x-1)" and insert -- n<$\hat{u}$(x-1) -- ;

line 59, delete "u(x)" and insert -- $\hat{u}(x)$ -- .

Column 4, line 51, delete "$\leqq$" and insert -- > -- ;

line 60, delete "scalr" and insert -- scalar -- .

Column 5, line 15, delete "product" and insert -- point -- ;

line 33, delete "not" (first occurrence) and insert -- , -- .

Column 6, line 13, before "$J^n$" insert -- ( -- ;

UNITED STATES PATENT AND TRADEMARK OFFICE
CERTIFICATE OF CORRECTION

PATENT NO. : 4,319,221
DATED : March 9, 1982
INVENTOR(S) : Miroaki SAKOE

It is certified that error appears in the above—identified patent and that said Letters Patent is hereby corrected as shown below:

Column 6, line 48, after "each" insert -- of -- .

Column 9, line 52, delete "is" (second occurrence) and insert -- in -- .

Column 13, line 24, after "(k-1" insert -- ) -- .

Column 15, line 15, delete "poriods" and insert -- periods -- .

Signed and Sealed this

Twenty-second Day of June 1982

[SEAL]

Attest:

Attesting Officer

GERALD J. MOSSINGHOFF
Commissioner of Patents and Trademarks